United States Patent Office 3,159,672
Patented Dec. 1, 1964

3,159,672
PREPARATION OF PARA-TOLUIC ACID
Deryck Harry Derbyshire and Arthur Dudley Craven, Harrogate, England, assignors to Imperial Chemical Industries Limited, London, England, a corporation of Great Britain
No Drawing. Filed June 25, 1962, Ser. No. 205,095
Claims priority, application Great Britain, July 3, 1961, 23,915/61
2 Claims. (Cl. 260—524)

This invention relates to the preparation of para-toluic acid by the reaction of para-xylene with nitric oxide.

It is known that para-toluic acid can be prepared by the oxidation of para-xylene with nitric acid. Nitric acid is commonly made by the oxidation of nitric oxide with oxygen in the form of air with simultaneous absorption of the dinitrogen tetroxide produced in water to give nitric acid together with further nitric oxide which is reoxidised and so on. This process requires a large volume of reaction space. Moreover, since nitric acid is a highly corrosive substance, the material of construction of the reactor is of necessity expensive, e.g. of a stainless steel. It is obvious, therefore, that the reaction of the originally obtained nitric oxide with para-xylene to give para-toluic acid would represent an advantageous step.

According to our invention, we provide a process for the manufacture of an aromatic carboxylic acid by reacting a methyl substituted aromatic compound alone or in an inert solvent with nitric oxide at a temperature such as to maintain a liquid phase.

We have found that when nitric oxide is bubbled through para-xylene heated at 140° C. and at atmospheric pressure, para-toluic acid is formed in good yield and the nitric oxide is reduced to nitrogen. We have found that the reaction is conveniently carried out by recirculation of the nitric oxide through the para-xylene in order to facilitate effective use of the nitric oxide. Although we find it convenient to carry out the reaction just below the boiling point of para-xylene, the reaction can also be carried out at lower temperatures, or, if a suitable pressure is maintained so that the para-xylene remains in the liquid state, at higher temperatures. An increase in the partial pressure of nitric oxide leads to an increase in the rate of reaction, there is therefore an advantage in the use of higher pressures but the reaction can equally be carried out at or below atmospheric pressure having due regard to the temperature.

Although we have only exemplified the preparation of para-toluic acid, other obvious modifications of the process will suggest themselves to those versed in the art. Thus, for example, benzoic acid may be produced from toluene and meta-toluic acid from meta-xylene.

In the case of the reaction of para-xylene with nitric oxide, the products of the reaction are para-toluic acid, para-tolunitrile and para-xylyl para-toluate. The para-tolunitrile is a potential source of further para-toluic acid, which may be obtained by hydrolysis by known methods. The para-xylyl para-toluate is also a source of further para-toluic acid since, on hydrolysis by known methods, it yields para-toluic acid and para-xylyl alcohol. The para-xylyl alcohol may also be oxidised by known methods to para-toluic acid.

The following example, in which all parts and percentages are by weight, except where otherwise indicated, illustrates, but does not limit our invention.

Example

The nitric oxide used in the reaction was prepared by the action of concentrated sulphuric acid on an aqueous solution of sodium nitrite. The gas was purified by bubbling it through two wash bottles in series containing 20% aqueous potassium hydroxide to remove carbon dioxide and nitrogen dioxide and then dried by passing through two cold traps immersed in a freezing mixture of solid carbon dioxide and acetone at −78° C.

The reaction was carried out in a glass apparatus consisting of a reaction vessel communicating with an extra vessel in such a manner that nitric oxide could be pumped by means of a pump from the extra vessel into the reaction vessel wherein the nitric oxide bubbled through the reaction mixture and into the gas space from whence it could recirculate to the extra vessel. Thus the nitric oxide was repeatedly brought into contact with the liquid phase.

The apparatus was evacuated to a pressure of $10^{-4}$ mm. and para-xylene (43 parts) and nitric oxide (12 parts) were introduced into the reaction vessel. The pressure was thereby raised to 800 mms. of mercury at 20° C. The pump was started and the nitric oxide thereby caused to bubble through the para-xylene at a rate of 0.4 litre per minute. External heating was applied to the reaction vessel and the temperature of the para-xylene was raised to 140° C. during 10 minutes. The nitric oxide was preheated to 140° C. before entry into the para-xylene.

The reaction was carried on for 48 hours, after which time the reaction appeared to be complete as judged by the cessation of fall in pressure indicating that nitric oxide was no longer being absorbed by the reaction mixture.

Water was formed during the reaction, and was removed from the reaction system by condensation of the para-xylene vapour and water vapour from the gas flowing from the reaction vessel by a cooled section of the piping between the reaction vessel and the pump, the separated, immiscible para-xylene and water separating by virtue of the difference in their densities, the para-xylene forming the upper layer and being arranged to flow back to the reactor leaving the water segregated.

The final pressure of the system was 400 mms. of mercury at 20° C. The residual gas had the following composition by volume: carbon dioxide—1.2%, nitric oxide—48.1%, nitrogen—40.2% and nitrous oxide—10.7%.

After distilling off the unchanged para-xylene from the reaction mixture, there remained 15.1 parts of a mixture of liquid and crystals. The amount of unchanged para-xylene recovered was 29.5 g.

The crystalline product was separated by filtration and was found to be para-toluic acid. It amounted to 2.6 g. Thus the yield, based on the amount of para-xylene reacted, was 15.0%. The liquid product was found to consist of para-xylyl para-toluate—11.4 g. and para-tolunitrile—1.1 g.

What we claim is:

1. A process for the preparation of para-toluic acid comprising reacting a mixture consisting essentially of liquid para-xylene and nitric oxide at a temperature of about 140° C. and at a pressure sufficient to maintain the para-xylene in a liquid state.

2. The process of claim 1 wherein the temperature is 140° C. and the pressure is 800 mm. of mercury at 20° C.

References Cited by the Examiner

UNITED STATES PATENTS

| | | | |
|---|---|---|---|
| 1,332,028 | 2/20 | Coblentz et al. | 260—524 |
| 2,839,575 | 6/58 | Fetterly | 260—524 |

FOREIGN PATENTS

| | | |
|---|---|---|
| 698,157 | 10/53 | Great Britain. |
| 823,437 | 11/59 | Great Britain. |

LORRAINE A. WEINBERGER, *Acting Primary Examiner.*

LEON ZITVER, *Examiner.*